United States Patent
Nakahara et al.

(12) 
(10) Patent No.: US 6,568,415 B2
(45) Date of Patent: May 27, 2003

(54) STORING DEVICE FOR EASILY POLYMERIZABLE AND COAGULATING LIQUID SUBSTANCE AND METHOD FOR PRESSURE CONTROL THEREOF

(75) Inventors: Kenji Nakahara, Himeji (JP); Takeshi Nishimura, Himeji (JP); Kazuhiko Sakamoto, Himeji (JP); Hiroo Iwato, Himeji (JP); Masakatsu Mori, Hyogo (JP)

(73) Assignee: Nippon Shokubai Co., Ltd. (JP)

( * ) Notice: Subject to any disclaimer, the term of this patent is extended or adjusted under 35 U.S.C. 154(b) by 162 days.

(21) Appl. No.: 09/906,255

(22) Filed: Jul. 16, 2001

(65) Prior Publication Data

US 2002/0014265 A1 Feb. 7, 2002

(30) Foreign Application Priority Data

Aug. 2, 2000 (JP) ........................................ 2000-234543

(51) Int. Cl.⁷ .............................................. F16K 49/00
(52) U.S. Cl. ................... 137/1; 137/331; 137/251.1; 137/247.49; 137/493; 137/493.8
(58) Field of Search ................................ 137/331, 334, 137/247, 251.1, 493, 493.8, 247.49, 1

(56) References Cited

U.S. PATENT DOCUMENTS

| 266,485 | A | * | 10/1882 | Lightbody ............. 137/247.25 |
| 883,700 | A | * | 4/1908 | Drager .................... 137/252 |
| 1,063,116 | A | * | 5/1913 | Buck ....................... 137/334 |
| 1,461,404 | A | * | 7/1923 | Roth ..................... 137/251.1 |
| 2,367,158 | A | * | 1/1945 | Ulm ..................... 137/251.1 |
| 2,646,065 | A | * | 7/1953 | Tyson ..................... 137/341 |
| 3,648,018 | A | * | 3/1972 | Cheng et al. ............ 137/341 |
| 4,091,837 | A | * | 5/1978 | Edmunds et al. ........ 137/341 |
| 4,257,445 | A | * | 3/1981 | Cook et al. ............. 137/341 |
| 6,199,577 | B1 | | 3/2001 | Bomber et al. |

* cited by examiner

Primary Examiner—John Rivell
(74) Attorney, Agent, or Firm—Mathews, Collins, Shephard & McKay, P.A.

(57) ABSTRACT

A storing device is disclosed having a gas-sealing device and/or a heating device provided for a pipe connecting a storing tank for an easily polymerizable and/or coagulating liquid substance and a liquid sealing implement-protecting device. A method for the control of the pressure in the storing device is also disclosed. This invention contemplates protecting a storing device against deformation and fracture.

19 Claims, 3 Drawing Sheets

STORING DEVICE FOR EASILY POLYMERIZABLE AND COAGULATING LIQUID SUBSTANCE AND METHOD FOR PRESSURE CONTROL THEREOF

BACKGROUND OF THE INVENTION

1. Field of the Invention

This invention relates to a storing device for an easily polymerizable and/or coagulating liquid substance and a method for the control of pressure in the device.

2. Description of Related Art

The interior of a tank containing a polymerizable or coagulating liquid is generally retained under prescribed pressure. When the interior pressure of this tank tends to increase or decrease from the prescribed pressure, the breather valve opens and adjusts the pressure with a view to preventing the tank from being deformed or fractured.

For tanks that are sealed with a gas, a method is widely adopted which comprising introducing a gas by a PC (Pressure Control) valve and, when the gas pressure in the tank becomes unduly high, causing this inner pressure to revert to the fixed level by discharging the excess of the gas by a breather valve or a pressure seal pot as the method for retaining the inner pressure of a pressured tank. The atmospheric storage tanks generally adopt the method which comprises retaining the inner pressure of a tank (atmospheric pressure) by exposing the interior of the tank to atmosphere through a vent line disposed in the tank and allowing the tank to acquire a necessary gas seal by the supply of a gas at a fixed flow volume by a FC (Flow Control) valve.

In tanks for storing an easily polymerizable or coagulating compound, however, polymerization or condensation occurs in the gas phase part of the tanks and a polymer or a condensate adheres to the roof part of the tanks. In other words, the breather valve, the PC valve, and the vent line of the tank incur blockage due to the adhesion of the polymer or condensate and then they permit admission or release of a gas therethrough only with difficulty.

On the blockage mentioned above occurs, when the inner pressure of the tank rises, it is impossible for the gas to be discharged through the breather valve or the vent line and inflicts deformation or fracture on the tank. Conversely, the tank possibly sustains deformation such as depression or fracture during the presence of decompression, since the gas introduction through the breather valve or the vent line is not attainable.

When the interior of tanks is capable of repressing polymerization or condensation, it can preclude the blockage in the valve, the breather valve, and the vent line and adjust the pressure. The repression of polymerization in the tank may be accomplished by the method that comprises circulating a liquid in the tank and adding a polymerization inhibitor such as hydroquinone or phenothiazine to therein. The inhibitor is present mainly in the liquid phase and nearly absent in the gas phase. When the vapor condenses on the dry part of tank interior, it readily polymerizes and comes to clog the pipings to the tank because the inhibitor is scarce in the gas phase.

Thus, the conventional method possibly entails the problem of suffering a decrease in productivity (storing property) in the tank for storing an easily polymerizable substance and fails to permit safe lasting storage of the substance.

SUMMARY OF THE INVENTION

It is, therefore, an object of this invention to provide a tank which serves to admit and emit a polymerizable or coagulating liquid, is capable of preventing the tank from being deformed and fractured by the phenomenon of compression and decompression, and is enhanced safety of operation.

Another object of the invention is to provide a method for preventing a storing device from inducing polymerization of the substance being stored therein and enabling this device to acquire high productivity.

We have pursued a diligent study concerning a tank serving to admit and emit a polymerizable or coagulating liquid, and found that by providing a gas-sealing device and/or a heating device in the pipe between a liquid sealing device and the tank with, it is possible to prevent polymerization of the polymerizable substance, prevent the pipe from being blocked, and consequently prevent the tank from being deformed or fractured. This invention has been perfected.

The object of this invention is accomplished by a storing device characterized by providing a gas-sealing device and/or a heating device in the pipe between a storing tank for an easily polymerizable and/or coagulating liquid substance and a liquid sealing implement-protecting device.

The object of this invention is also accomplished by a method for controlling the pressure of a storing device, characterized by flowing a sealing gas in the pipe between a storing tank for an easily polymerizable and/or coagulating liquid substance and a liquid sealing implement-protecting device and/or heating the pipe.

According to the storing device of the invention, since providing the gas-sealing device or the heating device or optionally both for the pipe between the tank and the liquid sealing implement-protecting device, it is incapable of condensing within the pipe the vapor generated from the liquid in the tank and, further because of the continued flow of the sealing gas within the pipe, is capable of precluding the possible stagnation of the vapor in the pipe, allaying or eliminating the condensation and polymerization of the vapor, and consequently preventing the tank from being deformed or fractured.

According to the method for controlling the inner pressure of the storing device of the invention, by a simple procedure of continuously flowing a sealing gas to the pipe between a tank and a liquid sealing implement-protecting device or heating the pipe or optionally performing both these actions, it is enabled to allay or eliminate the adhesion to the pipe of the vapor generated from the liquid and consequently prevent the tank from being deformed or fractured.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DETAILED DESCRIPTION OF THE PREFERRED EMBODIMENTS

Figure 1:
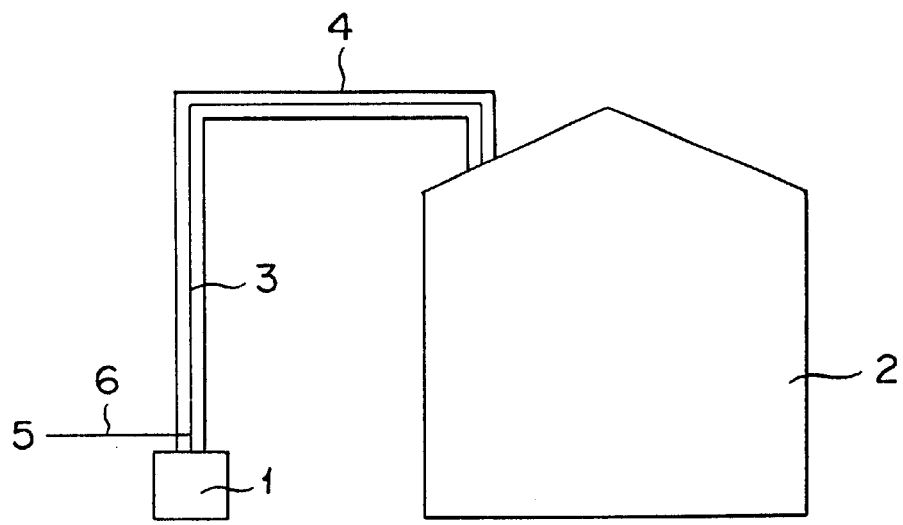
FIG. 1 is an explanatory diagram illustrating a pipe between a liquid sealing implement-protecting device and a tank, furnished with a gas-sealing device and a heating device and a tank.

Now, the storing device of this invention will be described below.

The polymerizable and/or coagulating liquid substance to be used in this invention is a liquid substance that naturally manifests the property of polymerization or coagulation or both when it is stored in a tank. Specifically, examples of polymerizable liquids may include acrylic acid, methacrylic acid, acrolein, and methacrolein, and the esters of (meth)acrylic acid such as hydroxyethyl (meth)acrylate, hydroxypropyl (meth)acrylate, glycidyl (meth)acrylate, methyl (meth)acrylate, butyl (meth)acrylate, ethyl acrylate, 2-ethylhexyl acrylate, and N,N-dimethylaminoethyl (meth)acrylate, and examples of coagulating liquids maleic anhydride and phthalic anhydride. Particularly when the liquid substance mentioned above happens to be at least one member selected from the group consisting of acrylic acid, methacrylic acid, acrylic esters, methacrylic esters, maleic anhydride, and phthalic anhydride, the prevention of the pipe, which is fitted to the tank, from blockage proves effective.

The storing device or tank to be used in this invention is not restricted but generally required to be of a type adapted for permitting gas sealing. It embraces tanks operated under increased pressure or under normal pressure, for example. The size of this storing device is not particularly limited but required to be sufficient for storing the liquid substance.

A liquid sealing implement-protecting device fitted to the tank is not particularly restricted but fitted to the gas phase part of the tank through a pipe without contacting the liquid held in the tank. Examples of this implement-protecting device may include U-shaped liquid sealing type (capable of coping with both increased and decreased pressures) protecting devices, V-shaped liquid sealing type (capable of coping with both increased and decreased pressures) protecting devices, increased pressure grade liquid sealing devices, and reduced pressure grade liquid sealing devices. It is particularly advantageous for the control of pressure during an increase or a decrease of pressure to use one liquid sealing device furnished with the function to cope with both an increased and decreased pressures, namely one device capable of manifesting the two functions, or to use a liquid sealing device capable of coping with an increased pressure and a liquid sealing device capable of coping with a decreased pressure combined in one set.

The tank and the implement-protecting device are connected with a pipe. This pipe is provided with a gas-sealing device or a heating device. When the pipe is provided with both devices, the blockage can be effectively allayed or prevented. The gas-sealing device is used for precluding that the vapor generated from the liquid will condense on or adheres to the interior of piping and the condensate will accumulate or polymerize to block the pipe. It is not restricted but generally capable of flowing an inert or non-flammable gas. The heating device is not restricted but capable of vaporizing the condensed or deposited vapor with heat and maintaining a temperature higher than the temperature of the inner liquid of the tank. Examples of the heating device may include jackets and traces.

FIG. 1 is an explanatory diagram illustrating a pipe provided in a liquid sealing implement-protecting device with a gas-sealing device and a heating device. In FIG. 1, a pipe 3 connects the implement-protecting device 1 and a tank 2. This pipe 3 is furnished with a known heating device 4 such as a trace or a jacket. The pipe 3 is further provided in the proximity of the implement-protecting device 1 with a pipe 6 for a sealing gas 5. Owing to the construction described above, the fact this vapor expelled by evaporation from the liquid in the tank 2 will stagnate in the pipe 3 is eliminated because the sealing gas 5 flows through the pipe 3 into the tank 2, and the fact that the vapor will be condensed in the pipe 3 will be likewise eliminated because the pipe 3 is being heated with the heating device 4. Consequently, the degree with which the polymer is formed in the pipe 3 is decreased extremely and the degree with which the condensate is formed and accumulated is decreased greatly. Since the ratio of blockage of the pipe 3 is consequently allayed or greatly decreased, it is possible to eliminate the factor for deformation and fracture of the tank 2.

When accessories such as a pressure gauge, a liquid level instrument, and a breather valve are furnished with the gas-sealing device and/or heating device, these are protected, enabled to manifest their functions fully, manage the status of the tank, and consequently allowed to protect the storing device.

The pressure gauge is not restricted but generally capable of measuring the pressure in the tank. Examples of the gauge may include digitalized electric pressure transmitters adopting a semiconductor strain gauge or a resistance wire strain gauge as pressure elements. The liquid level instrument is not restricted but generally capable of measuring the liquid level in the tank. Example of the level instrument may include a liquid level gauge of the type which comprises pressure gauges disposed one each in the lower part of the tank and in the gas phase part of the tank and effects computation of the volume and height of the inner liquid of the tank by subtracting the pressure in the gas phase part from the pressure in the lower part.

Figure 2:
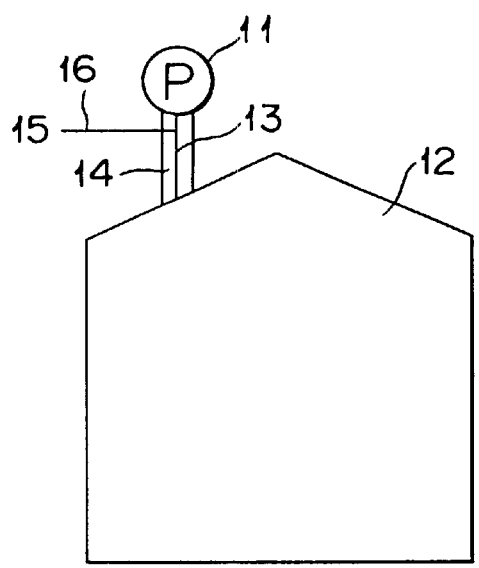
FIG. 2 is an explanatory diagram illustrating a scheme of piping between a pressure gauge and a tank, furnished with a gas-sealing device and a heating device.

FIG. 2 is an explanatory diagram illustrating a pipe provided with a gas-sealing device and a heating device. In FIG. 2, a pipe 13 is connected between a pressure gauge 11 and a tank 12. This pipe 13 is furnished with a known heating device 14 such as a trace or a jacket. Further, the pipe 13 is provided in the proximity of the pressure gauge 11 with a pipe 16 for a sealing gas 15. Owing to the construction described above, the fact that the vapor expelled by evaporation from the liquid in the tank 12 will stagnate in the pipe 13 is eliminated because the sealing gas 15 flows through the pipe 16 for the sealing gas and the pipe 13 into the tank 12, and the fact that the vapor will be condensed in the pipe 13 will be likewise eliminated because the pipe 13 is being heated with the heating device 14. Thus, this construction, similarly to the construction of FIG. 1, can allay or eliminate the blockage of the pipe 13.

Those accessories, which like a pressure gauge are linked to a tank through a pipe, may be provided with a gas-sealing device and a heating device in the same manner as in the pressure gauge.

Further, the construction in which the pipe for sealing gas is directly connected to the tank and the pipe is fitted with an accessory such as a pressure gauge is embraced in the scope of this invention.

Figure 3:
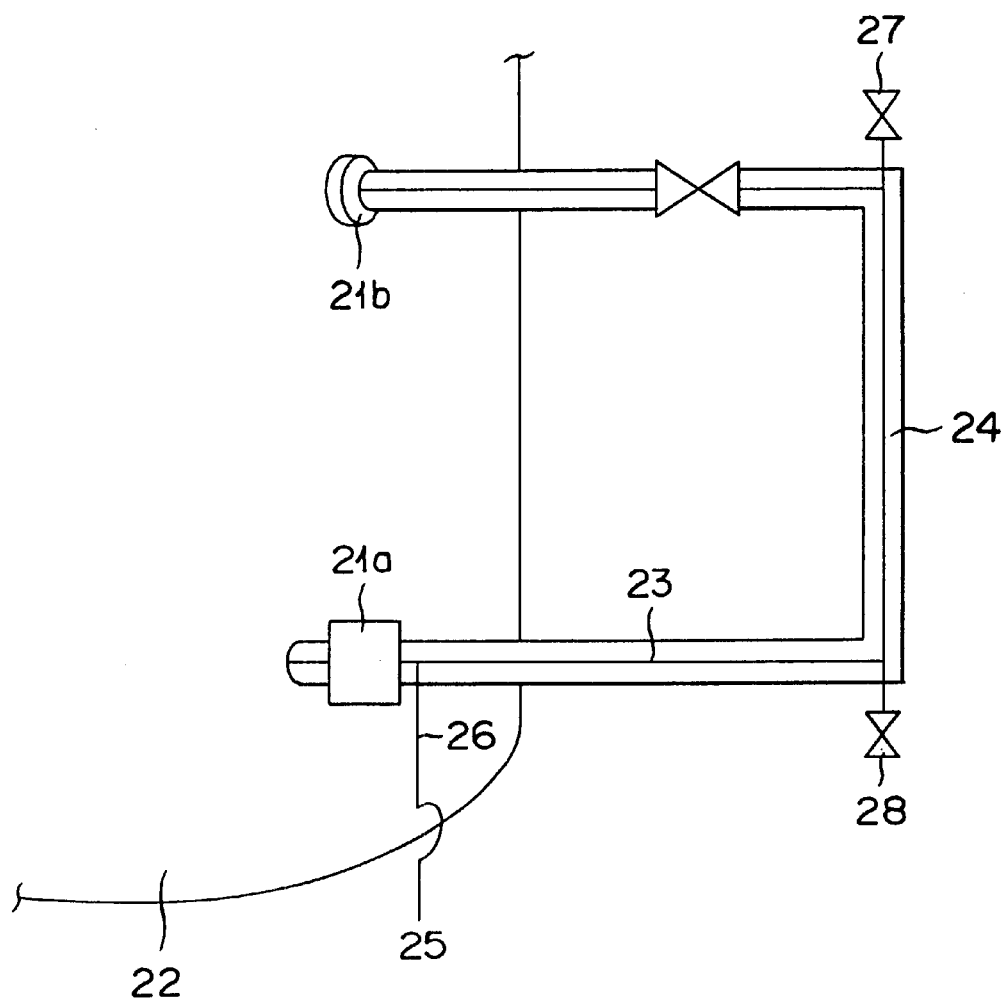
FIG. 3 is an explanatory diagram illustrating a scheme of piping between a liquid level instrument and a tank, furnished with a gas-sealing device and a heating device.

FIG. 3 is an explanatory diagram illustrating a pipe provided with a gas-sealing device and a heating device in the case of a liquid level instrument. In FIG. 3, a pipe 23 connects a pressure gauge 21a and a connecting port 21b in the lower part of a tank 22 and the pipe 23, if necessary, is provided in the upper part thereof with a vent valve 27 and in the lower part thereof with a drain valve 28. Further, the pipe 23 is fitted with a pipe 26 for the flow of a sealing gas 25. Since the sealing gas 25 is flowed through the pipe 23 and the gas phase part of the tank into the tank 22 owing to the construction described above, the liquid level gauge is enabled to allay or prevent the blockage of the pipe.

As regards the pipe for connecting the breather valve and the tank, since the breather valve has a function of automatically discharging the gas to regulate the pressure when the pressure rises, it does not supply the sealing gas to the interior thereof and, therefore, is provided solely with the heating device. When the tank is provided with a vent line, it effectively provides the heating medium in the same manner as in the case of the breather valve from the viewpoint of preventing the pipe from being blocked.

Now, the method for controlling the pressure of the storing device of the invention will be described below.

Using the storing device carries out the control of the pressure by the method of the invention. In the following description, the terms that are the same as those found hereinabove are used in the same meanings unless otherwise specified.

The method of this invention will be described based on the drawing annexed hereto.

Figure 4:
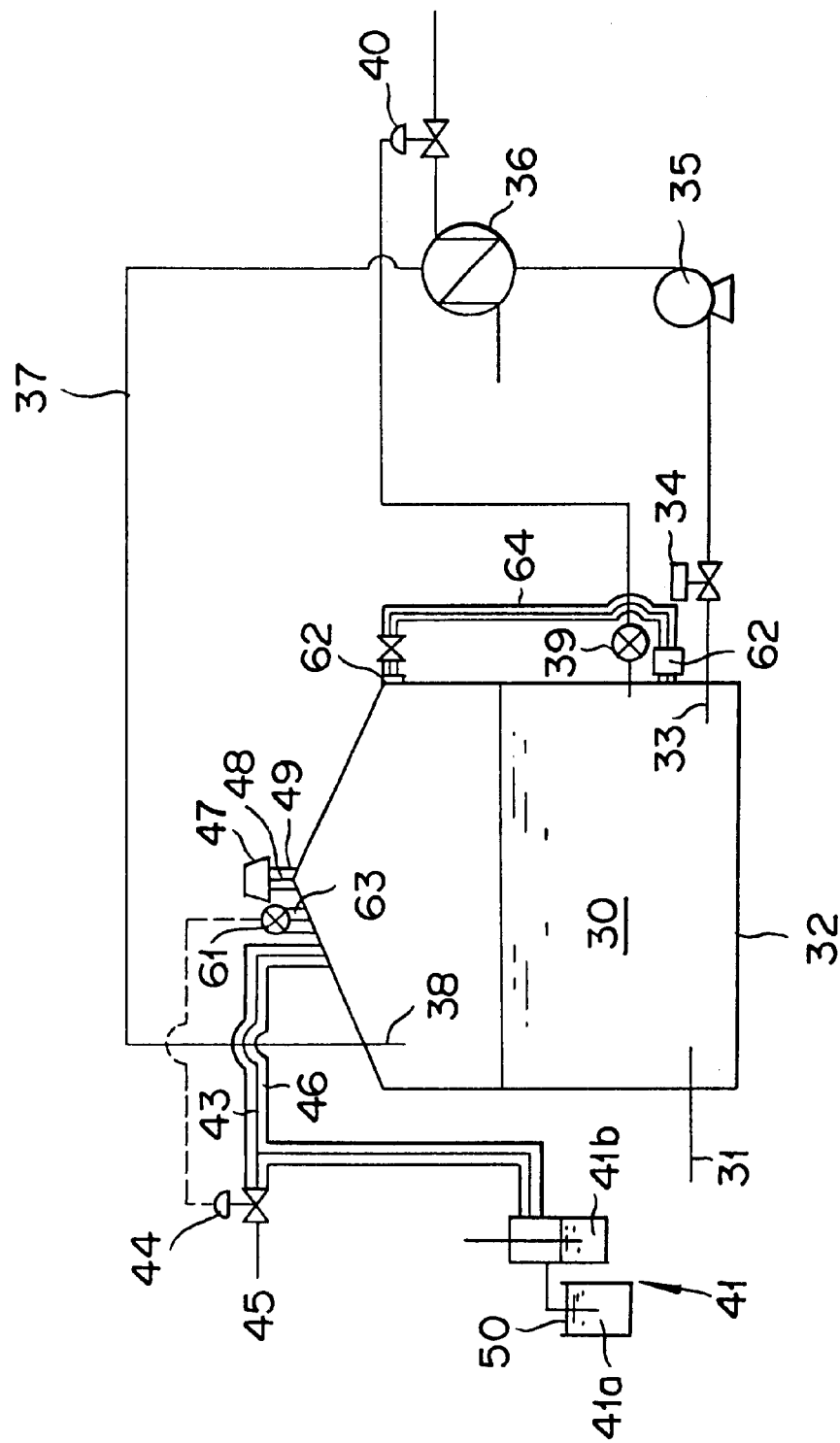
FIG. 4 is a layout diagram intended to describe a method for the control of the inner pressure of a tank provided between a sealing gas line with a liquid sealing implement-protecting device.

FIG. 4 is a layout diagram intended to describe a method for the control of the inner pressure of a tank provided in a sealing gas line with a liquid sealing implement-protecting device. In FIG. 4, a liquid 30 to be stored is introduced from a liquid introducing nozzle (side sheet) 31 into a tank 32. The interior of the tank 32, if necessary, is heated or cooled by the use of a heating or cooling device (not shown). Otherwise, the heating or cooling may be performed by a heat exchanger 36 disposed outside. Specifically, the liquid 30 in the tank is circulated from a liquid introducing nozzle 38 to the tank 32 via a liquid discharging nozzle 33, a valve 34, a pump 35, the heat exchanger 36, and a circulating pipe 37. The heat exchanger 36 measures the inner temperature of the tank 32 with a thermometer 39 in the lower part thereof and, based on the result of measurement, adjusts the temperature and flow volume of a refrigerant or thermal medium through a control valve 40.

A sealing gas 45 is supplied via a valve 44 and a pipe 43 to the tank 32. This pipe 43 is further provided with a pipe-heating device 46 such as a trace or a jacket. The pipe is provided with the implement-protecting device 41. Since the pipe 43 is supplied with the sealing gas 45 and, at the same time, provided with the heating device 46, the polymerization by condensation of the vapor generated from the liquid in the tank 32 can be allayed or eliminated. The sealing gas that has flowed into the tank 32 is discharged through a breather valve 47 or a vent line (not shown). Since a pipe 48 that is interposed between the breather valve 47 and the tank 32 is fitted with a heating device 49, the adhesion to the pipe of the vapor can be allayed or eliminated. If the breather valve 47 or the vent line is blocked, the tank 32 will be effectively prevented from being deformed or fractured because the implement-protecting device 41 is effectively actuated. The implement-protecting device 41 is enabled to operate the seal pot 41a on the increased pressure side when the interior of the tank 32 is compressed or the seal pot 41b on the reduced pressure side when the interior of the tank 32 is decompressed. The utilization of an inner condensate 50 of the plant that is continuously generated in the plant and emitted from a condensate recovering line for protecting device 41 proves advantageous as an effective use of the condensate.

The feed volume of the sealing gas per hour is properly not less than 0.1%, preferably in the range of 0.1 to 10%, and especially 1 to 2%, based on the inner volume of tank. If the flow volume falls short of 0.1%, the shortage will be at a disadvantage in not replenishing the gas enough to compensate for the decreased liquid and consequently entailing the possibility of deforming the tank. On that occasion, the interior of the tank is decompressed. It, however, easily recovers the original pressure so long as the feed volume of the sealing gas is proper. The sealing gas is preferred to be a non-flammable gas or an inert gas such as nitrogen or carbon dioxide gas that does not interact with the liquid in the tank.

When the liquid substance includes acrylic acid, methacrylic acid, an acrylic ester, or a methacrylic ester, the sealing gas is properly a gas comprising 1 to 9 vol. %, preferably 5 to 9 vol. %, of a molecular oxygen and an inert gas. If the content of the molecular oxygen falls short of 1 vol. %, the shortage will be at a disadvantage in easily inducing polymerization of the liquid substance. Conversely, if the content of the molecular oxygen exceeds 9 vol. %, the excess will be at a disadvantage in entailing the possibility that the sealing gas will fall in the explosion range.

The method for controlling the inner pressure of a tank has been described based on a liquid sealing implement-protecting device. FIG. 4 depicts further attachment of a pressure gauge 61 and a liquid level instrument 61 to the tank 32. The pipes connected to these accessorial devices are provided respectively with heating devices 63 and 64. Optionally, they may be further provided with a gas-sealing device.

EXAMPLES

Now, this invention will be described more specifically below with examples. These examples are not intended as a definition of the limits of the invention.

Example 1

In a tank having an inner volume of 300 m$^3$, the following liquid was stored by means of a system illustrated in FIG. 4 and operated under the following conditions:

1. Liquid in the tank: Butyl acrylate
2. Inner pressure of the tank: Pressure set at 300 mmH$_2$O
3. Amount of liquid stored in the tank: 200 m$^3$
4. Diameter of pipe forming sealing gas line: 1½ B
5. Nitrogen gas containing 5 vol. % of molecular oxygen, after having the pressure thereof adjusted with a pressure adjusting valve, was supplied to the tank.
6. A pressure gauge and a pipe for breather valve were wrapped with trace (temperature set at 120° C.).
7. The temperature of the inner liquid was set at 20° C. and the amount of the liquid circulated to the heat exchanger at 20 m$^3$/hr.
8. A seal pot capable of coping with both an increased pressure and a decreased pressure was installed.

Circulating the liquid was continued under the conditions mentioned above for three months. Then, the operation was stopped and the tank opened to inspect the interior thereof. The inspection did not detect any discernible sign of either the adhesion of a polymer to the breather valve, the pressure gauge, the liquid level gauge, and the sealing gas line or the blocking of the pipe therewith.

Circulating the liquid was further continued under the conditions for six months. Then, the operation was stopped and the tank opened to inspect the interior of the pipe. This inspection detected in the breather valve a discernible sign of the adhesion of a polymer in about 20% of the available horizontal cross section of the opening part and did not detect any discernible sign of either the adhesion of a polymer to the sealing gas line, the pressure gauge, and the liquid level gauge or the blockage of the pipe therewith.

Comparative Example 1

The procedure of Example 1 was repeated except that the supply of the sealing gas 45 was omitted to the pipe 46 connecting the seal pot 41 and the tank 32 and also the application of trace omitted to the pressure gauge 61, the breather valve 47, and the liquid level instrument 62.

After circulating the liquid was continued for six months, the operation was stopped to inspect the interior of the tank. This inspection detected in the breather valve a discernible sign of the adhesion of a polymer in about 40% of the available horizontal cross section of the opening part and also detected in the pipe connecting the tank and the seal pot a discernible sign of the adhesion of a polymer in about 20% of the available horizontal cross section of the interior of the pipe.

Comparative Example 2

The procedure of Example 1 was repeated except that the seal pot 41b adapted with the decreased pressure side was omitted and the seal pot 41a (fitted with a sealing gas and trace) adapted with the increased pressure side in use left.

When circulating the liquid was continued, the pressure in the tank suddenly decreased in one year of starting the operation. Then, the operation was stopped to inspect the interior of the tank. The inspection found the breather valve blocked with a polymer. The tank was in a substantially closed state because the breather valve was blocked and the seal pot adapted with the reduced pressure was absent from the tank. It is presumed that the excessive decompression of the interior of the tank was caused by the emission of the liquid from the tank. The tank was saved from being deformed or fractured. It ought to have been deformed or fractured infallibly if the measure was delayed.

The entire disclosure of Japanese Patent Application No. 2000-234543 filed on Aug. 2, 2000 including specification, claims, drawings and summary are incorporated herein by reference in its entirety.

What is claimed is:

1. A storing device having a gas-sealing device and/or a heating device provided for a pipe connecting a storing tank for an easily polymerizable and/or coagulating liquid substance and a liquid sealing implement-protecting device.

2. A device according to claim 1, wherein the implement-protecting device is a liquid sealing device having a protecting function in both an increased pressure and a decreased pressure.

3. A device according to claim 1, wherein the liquid substance manifests the property of polymerization or coagulation.

4. A device according to claim 3, wherein the liquid substance is at least one member selected from the group consisting of acrylic acid, methacrylic acid, an ester of acrylic acid, an ester of methacrylic acid, maleic acid and phthalic acid.

5. A device according to claim 4, wherein the liquid substance is at least one member selected from the group consisting of acrylic acid, methacrylic acid, acrolein, and methacrolein, hydroxyethyl (meth)acrylate, hydroxypropyl (meth)acrylate, glycidyl (meth)acrylate, methyl (meth) acrylate, butyl (meth)acrylate, ethyl acrylate, 2-ethylhexyl acrylate, and N,N-dimethylaminoethyl (meth)acrylate.

6. A device according to claim 2, wherein the implement-protecting device is a U-shaped, or V-shaped liquid sealing, implement-protecting devices.

7. A device according to claim 1, wherein the gas-sealing device is a device flowing an inert or non-flammable gas.

8. A device according to claim 7, wherein the gas is nitrogen or carbon dioxide gas.

9. A device according to claim 1, wherein the heating device is a jacket or trace.

10. A method for the control of the pressure of a storing device, which comprising:
supplying a sealing gas to a pipe connecting a storing tank for an easily polymerizable and/or coagulating liquid substance and a liquid sealing implement-protecting device; and/or heating said pipe.

11. A method according to claim 10, wherein the implement-protecting device is a liquid sealing device having a protecting function in both an increased pressure and a decreased pressure.

12. A method according to claim 10, wherein the liquid substance manifests the property of polymerization or coagulation.

13. A method according to claim 12, wherein the liquid substance is at least one member selected from the group consisting of acrylic acid, methacrylic acid, an ester of acrylic acid, an ester of methacrylic acid, maleic acid and phthalic acid.

14. A method according to claim 13, wherein the liquid substance is at least one member selected from the group consisting of acrylic acid, methacrylic acid, acrolein, and methacrolein, hydroxyethyl (meth)acrylate, hydroxypropyl (meth)acrylate, glycidyl (meth)acrylate, methyl (meth) acrylate, butyl (meth)acrylate, ethyl acrylate, 2-ethylhexyl acrylate, and N,N-dimethylaminoethyl (meth)acrylate.

15. A method according to claim 11, wherein the liquid sealing implement-protecting device is a U-shaped, or V-shaped liquid sealing, implement-protecting devices.

16. A method according to claim 10, wherein the gas-sealing device is a device flowing an inert or non-flammable gas.

17. A method according to claim 16, wherein the gas is nitrogen or carbon dioxide gas.

18. A method according to claim 16, wherein a feed volume of the sealing gas per hour is in the range of 0.1 to 10% based on the inner volume of tank.

19. A method according to claim 10, wherein the heating device is a jacket or trace.

* * * * *